US012516824B2

(12) United States Patent
Angele et al.

(10) Patent No.: US 12,516,824 B2
(45) Date of Patent: Jan. 6, 2026

(54) COOKING APPLIANCE HAVING A FOLDING DOOR WITH OFFSET HINGES

(71) Applicant: BSH Hausgeräte GmbH, Munich (DE)

(72) Inventors: Boris Angele, Diessen (DE); Christoph Becke, Grosskarolinenfeld (DE)

(73) Assignee: BSH Hausgeräte GmbH, Munich (DE)

( * ) Notice: Subject to any disclaimer, the term of this patent is extended or adjusted under 35 U.S.C. 154(b) by 347 days.

(21) Appl. No.: 17/928,293

(22) PCT Filed: Jul. 1, 2021

(86) PCT No.: PCT/EP2021/068828

§ 371 (c)(1),
(2) Date: Nov. 29, 2022

(87) PCT Pub. No.: WO2022/017792

PCT Pub. Date: Jan. 27, 2022

(65) Prior Publication Data

US 2023/0212899 A1 Jul. 6, 2023

(30) Foreign Application Priority Data

Jul. 22, 2020 (DE) ......................... 102020209224.9

(51) Int. Cl.
*F24C 15/02* (2006.01)
*E05D 15/26* (2006.01)

(52) U.S. Cl.
CPC .......... *F24C 15/023* (2013.01); *E05D 15/264* (2013.01); *E05Y 2900/30* (2013.01); *E05Y 2900/308* (2013.01)

(58) Field of Classification Search
CPC ...... F24C 15/023; F24C 15/026; F24C 15/02; E05D 15/26; E05D 15/264; E05Y 2900/30; E05Y 2900/308; E05F 15/605

(Continued)

(56) References Cited

U.S. PATENT DOCUMENTS

| | | | | |
|---|---|---|---|---|
| 2,649,085 A * | 8/1953 | Hurt | F24C 15/023 126/41 D | |
| 4,077,389 A * | 3/1978 | Vogel | F24C 15/021 277/637 | |

(Continued)

FOREIGN PATENT DOCUMENTS

| | | |
|---|---|---|
| CN | 101498465 A | 8/2009 |
| CN | 103216184 A | 7/2013 |

(Continued)

OTHER PUBLICATIONS

Machine Translation of FR 3014932 (Year: 2015).*
Machine Translation of CN 110945203 (Year: 2020).*
National Search Report CN 202180060500.2 dated Aug. 7, 2025.

*Primary Examiner* — Allen R. B. Schult
*Assistant Examiner* — Amy E Carter
(74) *Attorney, Agent, or Firm* — Michael E. Tschupp; Andre Pallapies; Brandon G. Braun

(57) ABSTRACT

A cooking appliance includes a housing having a cooking chamber closeable by a door. The door is a folding door including a first door segment and a separate second door segment. A first hinge apparatus directly interconnects pivotably the first and second door segments. A guide apparatus is arranged on the housing, with the first door segment connected at a door segment end to the guide apparatus via a second hinge apparatus. The second door segment is connected at a door segment end to the housing via a third hinge apparatus. When the folding door is closed, a pivot axis of the first hinge apparatus is arranged closer to the cooking chamber than a pivot axis of the second hinge apparatus and is arranged closer to the cooking chamber than a pivot axis of the third hinge apparatus, with respect to a depth direction of the cooking appliance.

19 Claims, 9 Drawing Sheets

(58) Field of Classification Search
USPC .......................................................... 126/198
See application file for complete search history.

(56) References Cited

U.S. PATENT DOCUMENTS

| | | | | |
|---|---|---|---|---|
| 2014/0097172 | A1* | 4/2014 | Kang | F24C 7/002 219/394 |
| 2017/0067280 | A1 | 3/2017 | Thomas | |
| 2019/0063123 | A1* | 2/2019 | Ham | E05C 7/005 |
| 2019/0128532 | A1* | 5/2019 | Weaver | F24C 15/023 |
| 2019/0383496 | A1* | 12/2019 | Scalf | F24C 15/026 |
| 2020/0025437 | A1* | 1/2020 | Park | F25D 23/02 |
| 2020/0408418 | A1* | 12/2020 | Diehl | F24C 15/006 |

FOREIGN PATENT DOCUMENTS

| | | | | | |
|---|---|---|---|---|---|
| CN | 110945203 | A | * | 3/2020 | E06B 3/481 |
| EP | 0462007 | A1 | | 12/1991 | |
| FR | 3014932 | A1 | * | 6/2015 | E05D 15/26 |

* cited by examiner

COOKING APPLIANCE HAVING A FOLDING DOOR WITH OFFSET HINGES

CROSS-REFERENCES TO RELATED APPLICATIONS

This application is the U.S. National Stage of International Application No. PCT/EP2021/068828, filed Jul. 7, 2021, which designated the United States and has been published as International Publication No. WO 2022/017792 A1 and which claims the priority of German Patent Application, Serial No. 10 2020 209 224.9, filed Jul. 22, 2020, pursuant to 35 U.S.C. 119 (a)-(d).

The contents of International Application No. PCT/EP2021/068828 and German Patent Application, Serial No. 10 2020 209 224.9 are incorporated herein by reference in their entireties as if fully set forth herein.

BACKGROUND OF THE INVENTION

On aspect of the invention relates to a cooking appliance comprising a housing. A cooking chamber of the cooking appliance is formed in the housing. Food can be prepared in the cooking chamber. The cooking appliance also has a door for closing the cooking chamber. The door is configured as a folding door. The folding door has a first door segment and a second door segment separate from the first door segment. The door segments are plate-like parts. The door segments form in an unfolded state a complete plate in one plane which closes the cooking chamber. The at least two door segments are directly interconnected pivotably by means of a first hinge apparatus. The first door segment is connected at an upper door segment end to a guide apparatus of the cooking appliance by means of a second hinge apparatus of the cooking appliance, said guide apparatus being arranged on the housing. The second door segment is connected at a lower door segment end to the housing by means of a third hinge apparatus of the cooking appliance.

Cooking appliances are known in many different exemplary embodiments relative to their design with doors. In this context, plate-like doors are known, wherein this door plate is configured as a body which is pivotable about a horizontal axis and about a vertical axis. Moreover, doors which can be retracted are also known. In these designs of cooking appliances, a storage space into which this door can be pivoted is configured below the cooking chamber. In these doors, the base body with its plate-like design is also designed as a body. Also in these exemplary embodiments, the relevant plate cannot be deformed per se.

Moreover, a cooking appliance which has a folding door with at least two door segments which are pivotable relative to one another is disclosed in US2019383496. In this prior art, however, a drawback can be seen to be that the pivot axes of the hinge apparatuses are positioned in one plane. This results in disadvantages, in particular in the closed state of this folding door. The folding door, in particular, can independently move slightly away from the housing and carry out a minimal folding movement. This can result in leakages of the closed door. The handling of the door for opening and closing is also a drawback in this regard, since it requires a greater expenditure of force by a user.

It is the object of the present invention to provide a cooking appliance in which a folding door is improved relative to the positioning and handling thereof.

BRIEF SUMMARY OF THE INVENTION

This object is achieved by a cooking appliance which has the features according to claim 1.

One aspect of the invention relates to a cooking appliance comprising a housing. A cooking chamber of the cooking appliance is formed in the housing. Food can be prepared in the cooking chamber. The cooking appliance also has a door for closing the cooking chamber. The door is configured as a folding door. The folding door has a first door segment and a second door segment separate from the first door segment. The door segments are plate-like parts. The door segments form in an unfolded state a complete plate in one plane which closes the cooking chamber. The at least two door segments are directly interconnected pivotably by means of at least one first hinge apparatus. The first door segment is connected, in particular, at an upper door segment end to a guide apparatus of the cooking appliance by means of at least one second hinge apparatus of the cooking appliance, said guide apparatus being arranged on the housing. The second door segment is connected, in particular, at a lower door segment end to the housing by means of at least one third hinge apparatus of the cooking appliance.

When the folding door is closed, a pivot axis of the first hinge apparatus is arranged closer to the cooking chamber than a pivot axis of the second hinge apparatus, with respect to the depth direction of the cooking appliance. Moreover, when the folding door is closed, a pivot axis of the first hinge apparatus is arranged closer to the cooking chamber than a pivot axis of the third hinge apparatus, with respect to the depth direction of the cooking appliance. By means of such a design, the pivot axes of the at least three hinge apparatuses are arranged offset to one another.

In particular, in one exemplary embodiment, in this context the central hinge apparatus is positioned with its pivot axis closer to the cooking chamber than the two other pivot axes of the other two hinge apparatuses, with respect to the height direction. In this example, the pivot axes are oriented in the width direction and thus horizontally. In a further exemplary embodiment, the pivot axes are oriented vertically and thus in the height direction. In this case, therefore, the central pivot axis in the width direction of the, in particular, three pivot axes is closer to the cooking chamber than the other two pivot axes in the depth direction.

By means of these exemplary embodiments it is made possible that the closed state of the folding door and thus the closed end position can be maintained in a particularly positionally accurate manner. Thus independent slight folding movements of the door segments can be avoided in the closed state of the door. In particular, a sealed positioning of the folding door on the housing, in particular on a front flange of the housing, can also be permanently achieved. Advantageously, this positioning of the pivot axes is also such that the opening and closing of the folding door is facilitated for a user. Due to this offset positioning of the pivot axes, in particular of the central pivot axis in the height direction in comparison with the two other pivot axes, the movement for folding and unfolding this folding door can be carried out with reduced force. In particular, when the opening of the folding door is to be carried out manually and directly by a user, therefore, a more user-friendly handling can be permitted.

In an exemplary embodiment, a spacing which is measured in the depth direction is between 2 cm and 7 cm between the pivot axis of the first hinge apparatus and the pivot axes of the second hinge apparatus and the third hinge apparatus. Such an offset permits the above-mentioned advantages to a particular extent.

In one exemplary embodiment, it is provided that the three hinge apparatuses are arranged such that in the folded-up end position or in the folded-up state the door segments are arranged at an internal angle of greater than 0° to one another. In particular, this internal angle is between 1° and 10°. By means of such a design, therefore, it is achieved that, in the end position in which the folding door is fully opened and the door segments are folded toward one another, these door segments are nevertheless not oriented parallel to one another with their planes. By means of the angled arrangement, the door segments are very advantageously guided from their folded end position into the unfolded position and thus in the direction of the closed end position of the folding door. Thus in this case initiating the movement of the door segments from this folded-up end position is also facilitated. The force expenditure is also reduced thereby. Moreover, due to this positioning it is also achieved that the sides of the door segments facing one another do not bear directly against one another, in particular not over the entire surface area. Thus, on the one hand, contamination or undesired rubbing and scratching of the components against one another can be avoided and, on the other hand, in the folded-up end position and thus in the fully open position of the folding door a ventilation of this region can also be achieved between the two door segments.

In one exemplary embodiment, it is provided that the guide apparatus is oriented vertically. In particular, the guide apparatus has guide rails on opposing side regions of the housing, in particular a front region of the housing. In particular, the guide apparatus is configured such that the first door segment of the folding door is guided by the guide apparatus over its entire folding path. In one exemplary embodiment, in which the folding and unfolding does not take place in the height direction but in the width direction of the cooking appliance, the guide apparatus, in particular the guide rails, are oriented horizontally.

In one exemplary embodiment, the first door segment is configured with a pane pack. This pane pack in principle forms the base body of the door segment, in turn resulting in the plate shape of the door segment due to the pane pack. This pane pack has at least two separate door panes. In one exemplary embodiment, it is provided that the second door segment has a pane pack with at least two door panes. In the second door segment, this pane pack also forms the base body of the second door segment and thus the basic plate shape of the second door segment. In this case, the two door panes are also separate panes. The door panes are arranged spaced apart from one another in the depth direction so that in this case an air space or an intermediate space is also configured between the door panes. In the unfolded, closed state of the folding door, and thus in the closed end position of the folding door, the pivot axis of the first hinge apparatus is arranged closer to the cooking chamber than the inner panes of the two pane packs respectively located closest to the cooking chamber. Thus this specific pivot axis of the first hinge apparatus is positioned further toward the cooking chamber than the two pane packs. This is a further very advantageous design regarding the aforementioned achievable advantages of the cooking appliance. Moreover, this design does not require any more complex shaping for the inner panes, in particular more complex leadthroughs and/or cutouts. By the positioning of this first hinge apparatus, more flexibility and variability in the movement guidance can also be achieved and a continuous folding and unfolding is permitted. The door panes are made, in particular, of glass.

In one exemplary embodiment, it is provided that the first door segment has a pane pack with at least two door panes, and the second door segment has a pane pack with at least two door panes. Preferably, a seal is arranged between the inner panes of the pane packs, which in comparison with the other door panes of the pane packs are located closer to the cooking chamber. In particular, this seal is a hollow chamber seal. In particular, the seal is a weatherstrip-type seal. Preferably, therefore, this separating point or the interface between the door panes or the rims of these inner panes facing one another is sealed. In particular, this seal is achieved both in the closed end position of the folding door and in the open end position of the folding door. Thus this interface between the rims of the inner pane facing one another is also sealed over the entire folding path. Thus it is also advantageously achieved that undesired temperature inputs into any other panes and/or intermediate regions between the door panes is avoided in all folded positions. Moreover, in this case an undesired heating of outer door panes of the pane packs is at least significantly reduced. Moreover, it is also achieved by such a seal of this specific interface that no contamination can pass from the cooking chamber into the intermediate spaces between the door panes of the pane packs. In particular, by this arrangement of the seal, a gap is sealed between a lower edge of the inner pane of the upper first door segment and an upper edge of the inner pane of the lower second door segment. In particular, as already mentioned, this is formed in all folded positions of the door segments relative to one another.

In one exemplary embodiment, the first door segment has a pane pack with at least two door panes. The second door segment has a pane pack with at least two door panes. In the closed, unfolded end position of the folding door, a spacing measured in the depth direction of the cooking appliance between two door panes of the first pane pack and/or a spacing between corresponding door panes of the second pane pack is larger by a multiple than a gap measured in the height direction of the cooking appliance between a lower edge of a door pane of the upper pane pack of the first upper door segment and an upper edge of a corresponding door pane of the lower pane pack of the second lower door segment. This is a further very advantageous embodiment. Thus it is possible that the intermediate space between the door panes can be used as a ventilation channel or cooling channel, and thus air can circulate through this intermediate space. Thus the door panes can be cooled. However, air is prevented from being able to escape in any other manner through the gaps between the edges or rims of the door panes facing one another.

In one exemplary embodiment, the first door segment has a pane pack with at least two door panes. The second door segment has a pane pack with at least two door panes. In the unfolded, closed end position of the folding door, a gap between a front pane of the first pane pack and a front pane of the second pane pack is arranged further down than a gap between a further door pane of the first pane pack and a corresponding further door pane of the second pane pack, with respect to the height direction of the cooking appliance. This is a further very advantageous embodiment. This is because this offset of the gaps which is formed, in particular, in the height direction of the door panes respectively assigned in pairs to one another and arranged in the same plane of the different pane packs, when the folding door is arranged in the closed state, permits the front pane of the first upper pane pack to overhang toward the front, in particular in the fully open end position of the folding door. Thus a certain protection is also achieved for a user, so that undesired contact is avoided, in particular, with the inner pane of the pane pack of the second lower door segment. This overhang, which is formed toward the front of the front pane of the upper door segment in the folded state, thus also forms a certain overhang at the top so that the door panes of the second pane pack cannot be easily touched, if at all.

In one exemplary embodiment, the folding door has a movement assistance apparatus. A folding force can be generated by means of this movement assistance apparatus so that the folding process and/or the unfolding process are assisted. Thus the expenditure of force is reduced for a user who manually moves the folding door.

In particular, the movement assistance apparatus has at least one spring by which at least the unfolding process for closing the folding door is assisted by the spring force as the folding force.

In one exemplary embodiment, the cooking appliance has a motor or a drive unit by which the folding process and the opening and/or closing movement of the folding door associated therewith take place at least partially driven by motor. Thus the handling by the user is minimized. Optionally, only the activation of the motor is required. This can be the case, for example, by actuating a control element of the appliance.

In one exemplary embodiment, the cooking appliance has a holding unit. The unfolded, closed end position of the folding door is held by this holding unit. Additionally or alternatively, the folded, open end position of the folding door can be held by a holding unit of the cooking appliance. The holding unit can have a snap connection and/or a magnetic holder. Any other holding options are also conceivable. Thus it is achieved that, in the respective end positions of the folding door, this door can be released by a user without the respective end position automatically having to be left again. Even if the movement assistance apparatus is present, it is possible, in particular, to fix the open, folded end position by the holding unit. In particular, the unfolding process can be at least assisted by means of the movement assistance apparatus only when the holding unit is released.

In one exemplary embodiment, the second hinge apparatus is connected to the guide apparatus by a non-destructively releasable connection. Thus it is also possible that the second hinge apparatus can be released from the guide apparatus. Thus the accessibility to the inside of the folding door can be improved. In particular, this is very advantageous for cleaning purposes or maintenance operations or assembly purposes.

Moreover, this non-destructively releasable connection is able to be handled in a simple manner and is correspondingly robust.

In one exemplary embodiment, this connection can have a bolt which is held so as to be pretensioned by a spring. By pushing against the spring force the bolt is non-destructively releasable from its connecting position with the guide apparatus for uncoupling the second hinge apparatus from the guide apparatus. A simple releasability and a coupling which can be carried out again is permitted thereby. In particular, this bolt also represents at the same time the guide element which is guided in the guide apparatus, in particular a guide groove of a guide rail of the guide apparatus.

In one exemplary embodiment, in the folded, open end position of the folding door an internal angle between the upper first door segment and the vertical is greater than 90°. Thus full accessibility to the cooking chamber is possible in this folded, open end position. The folding door is not in the way due to its ability to be pivoted to the front and downwardly.

In one exemplary embodiment, a storage space of the cooking appliance is configured in the housing below the cooking chamber. In particular, this storage space is separate from the cooking chamber. The storage space is not a cooking chamber. The storage space is not configured for introducing and preparing food. The storage space can be configured for receiving accessories. For example, for storing baking sheets or wire racks or other carriers for food to be cooked. This storage space, on the other hand, can also be configured as a warming compartment. In such a design, for example, food to be cooked which has already been prepared in the cooking chamber can then be kept warm in the warming compartment. In particular, the cooking appliance has a pivoting door which is separate from the folding door. This pivoting door is configured for closing the storage space or the warming compartment on the front side. In particular, a push-push mechanism is provided here in order to permit the opening and closing of this pivoting door.

The positions and orientations provided when the appliance is used as intended and arranged as intended are specified by the terms “top”, “bottom”, “front”, “rear”, “horizontal”, “vertical”, “depth direction”, “width direction”, “height direction”, etc.

Further features of the invention emerge from the claims, the figures and the description of the figures. The features and combinations of features mentioned above in the description, and the features and combinations of features mentioned hereinafter in the description of the figures and/or shown individually in the figures are not only able to be used in the respectively specified combination but also in other combinations or individually without departing from the scope of the invention. Thus embodiments of the invention are to be regarded as encompassed and disclosed which are not explicitly shown and explained in the figures but which are revealed and can be generated by separate combinations of features from the explained embodiments. Embodiments and combinations of features which thus do not have all of the features of an originally formulated independent claim are also to be regarded as disclosed.

BRIEF DESCRIPTION OF THE DRAWINGS

Exemplary embodiments of the invention are explained in more detail hereinafter with reference to schematic drawings. In the drawings.

DETAILED DESCRIPTION OF EXEMPLARY EMBODIMENTS OF THE PRESENT INVENTION

Figure 1:
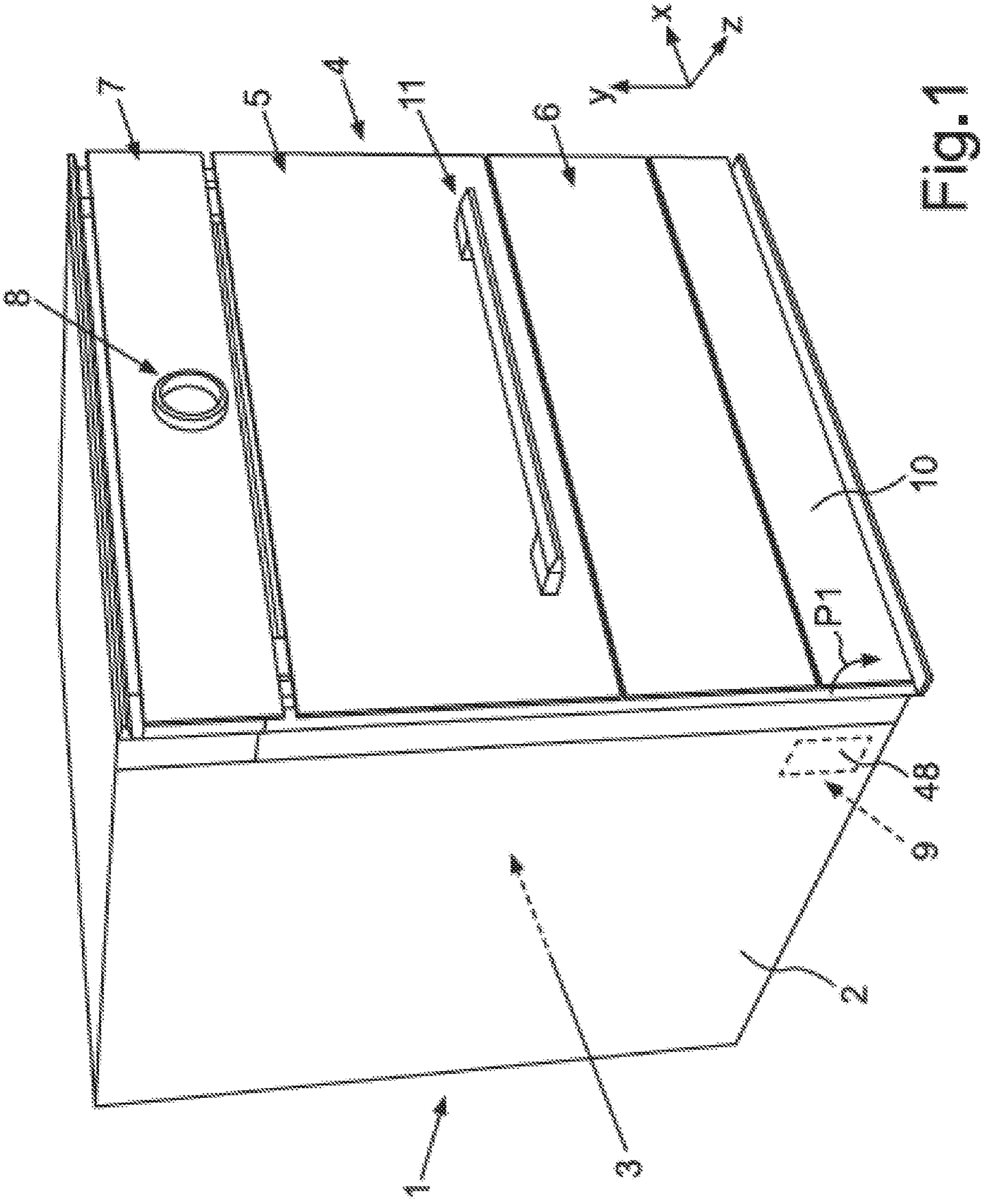
FIG. 1 shows a perspective view of an exemplary embodiment of a cooking appliance according to the invention with a folding door in the unfolded, closed end position.

Elements which are the same or functionally the same are provided with the same reference characters in the figures.

A cooking appliance 1 is shown in FIG. 1 in a schematic view. The cooking appliance 1 is configured for preparing food. The cooking appliance 1 can be an oven or a steam cooking appliance or a microwave cooking appliance. It can also combine at least two of the designs mentioned relative thereto.

The cooking appliance 1 has a housing 2. A cooking chamber 2 for preparing food is configured in the housing 2. Moreover, the cooking appliance 1 has a door which is arranged for closing the cooking chamber 3. The door is configured here as a folding door 4. It is movably arranged on the housing 2. In the exemplary embodiment, the folding door 4 has a first door segment 5 and a second door segment 6 which is separate therefrom.

The folding door 4 is configured here as a door which can be folded in the height direction (y-direction) of the cooking appliance 1. In a further exemplary embodiment, the folding door 4 can also be configured as a door which can be folded in the width direction (x-direction) of the cooking appliance 1. The following explanations thus apply accordingly, but rotated by 90°.

Moreover, in one exemplary embodiment the cooking appliance 1 has a control panel 7. The control panel 7 can also have a control apparatus and/or display apparatus 8.

In one exemplary embodiment, the cooking appliance 1 has a separate storage space 9 in addition to the cooking chamber 3. The storage space 9 is configured below the cooking chamber 3 in the height direction (y-direction) of the cooking appliance 1. The storage space 9 can serve for receiving carriers for food to be cooked, such as for example a baking sheet or a drip pan or a wire rack. On the end side the storage space 9 is closable by a separate door 10. This door is, in particular, a folding door. The door can be opened, in particular, by a push-push mechanism. In particular, a corresponding mechanism is provided here, said mechanism when pushed counter to the direction of the arrow P1 in the closed state of this door 10 releasing a blocking, so that then the opening movement can be automatically carried out in the direction of the arrow P1.

As provided in the exemplary embodiment, the folding door 4 has a handle 11. In this case, the handle 11 is preferably arranged on the upper first door segment 5. In particular, the handle is arranged in a lower vertical half, in particular a lower vertical third, of this first door segment 5, with respect to the height direction, wherein this can be seen in the unfolded, closed end position of the folding door 4 shown in FIG. 1.

In the exemplary embodiment it is provided that the upper first door segment 5 is higher than the lower second door segment 6, with respect to the closed end position of the folding door 4.

Figure 2:
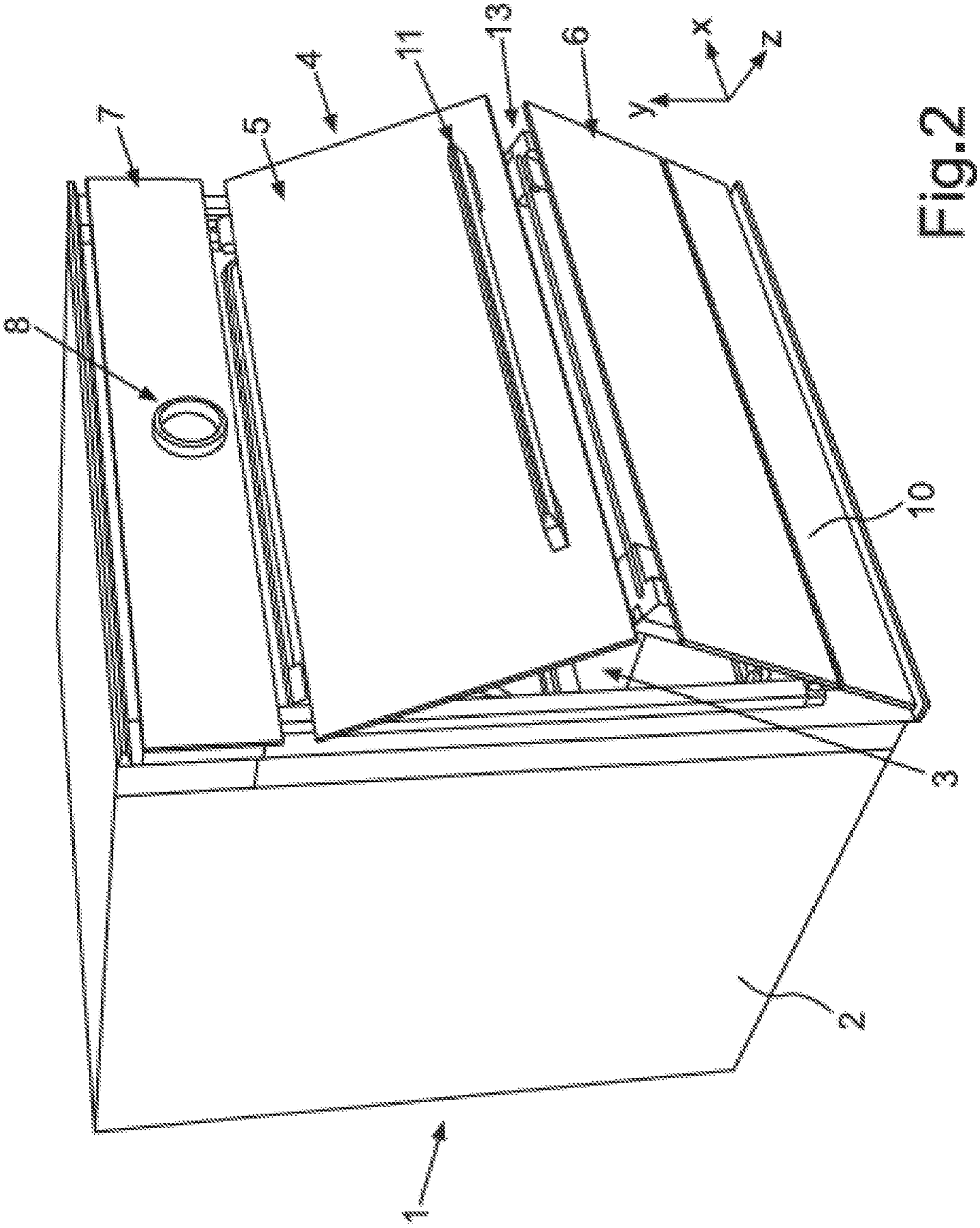
FIG. 2 shows the view of the cooking appliance according to FIG. 1, wherein the door is arranged in an intermediate position.

In FIG. 2 the cooking appliance 1 is shown in a state in which, starting from the closed, unfolded, end position in FIG. 1, the folding door 4 is partially opened. In this case, an intermediate position of the folding door 4 is shown between the closed end position and the fully open, folded, end position of the folding door 4.

As can be seen in FIG. 2, in one exemplary embodiment it is provided that the door 10 is coupled in terms of movement to the folding door 4, when a movement of the folding door 4 takes place. If the folding door 4 is shown in the closed, end position according to FIG. 1, the folding door 4 is not moved as a whole but the door 10 can also be separately opened and closed.

Figure 3:
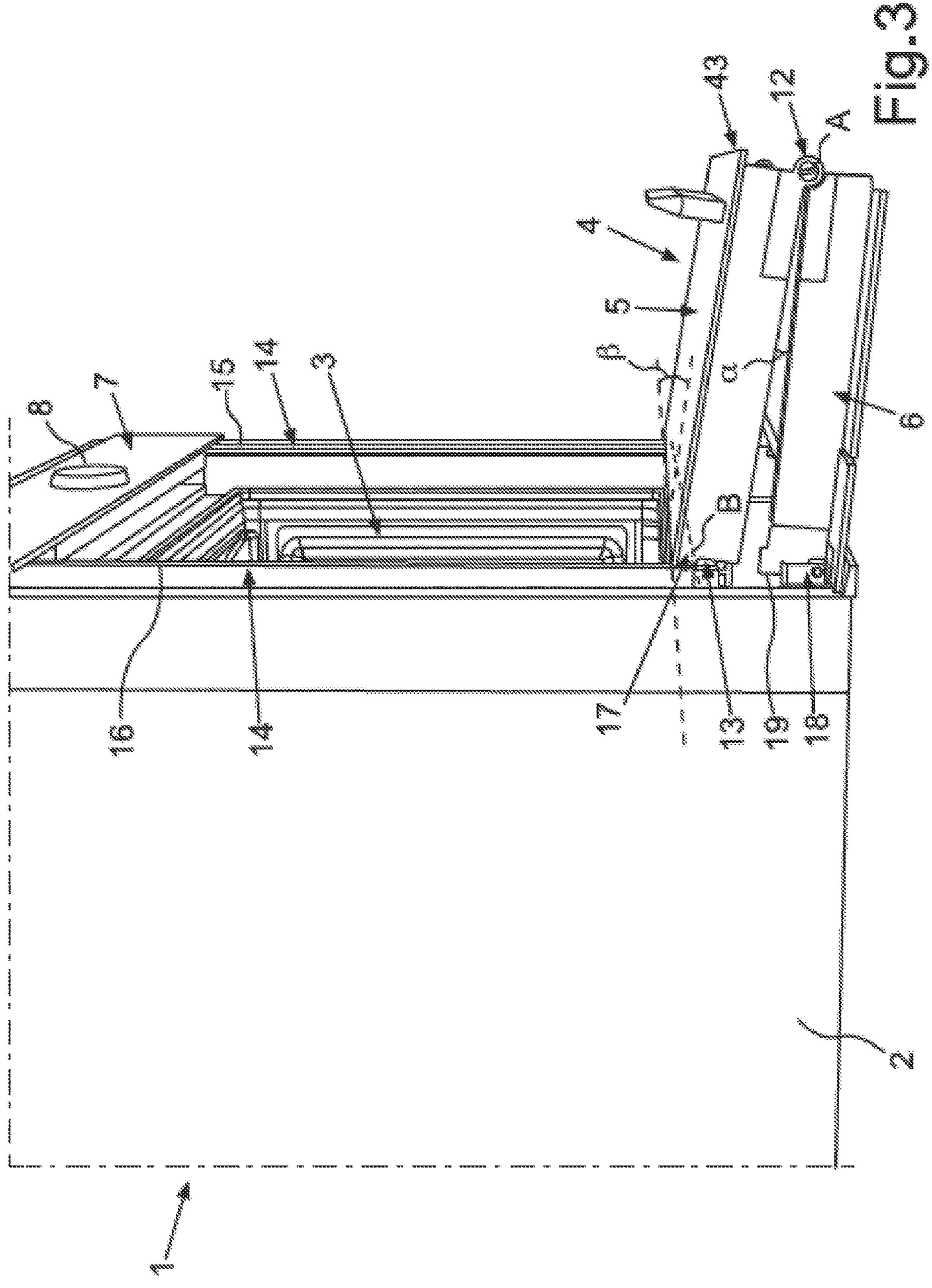
FIG. 3 shows a partial view of the cooking appliance according to FIG. 1 and FIG. 2 in a folded, open end position of the folding door.

In FIG. 3 the cooking appliance 1 is shown in a perspective view in a further position of the folding door 4. Here the fully open, folded end position of the folding door 4 is shown. As can be seen, the upper first door segment 5 is oriented in this open end position so as to be inclined downwardly at an angle β relative to a horizontal. In this regard, an angle between the vertical and the front face of the first door segment 5 is greater than 90°. Moreover, an internal angle α between the first door segment 5 and the second door segment 6 is greater than 0° and less than or equal to 10°.

As can be identified in FIG. 3, the folding door 4 is configured with a first hinge apparatus 12. This first hinge apparatus is a hinge apparatus which directly connects together the two door segments 5 and 6. A pivot axis A of this first hinge apparatus 12 is oriented in this case toward the plane of the figure.

Moreover, the first door segment 5 is connected to the housing 2 by a second hinge apparatus 13. In particular, in this context, a connection is provided to a guide apparatus 14 on the housing 2. In this respect, the direct connection thus permits the guidance of the first door segment 5, in particular, over the entire movement path between the open and the closed end position on the housing 2. In this case, the guide apparatus 14 has, in particular, two guide rails 15 and 16. These guide rails are oriented in the height direction and thus vertically. The guide rails are configured on opposing side regions of the housing 2, in particular on a front flange of the housing 2. The second hinge apparatus 13 is configured at an upper end 17 of the first door segment 5.

Moreover, a third hinge apparatus 18 is provided. The second door segment 6 is movably connected to the housing 2 by this third hinge apparatus 18. In particular, a lower end 19 of the second door segment 6 in the height direction is connected to this hinge apparatus 18. The third hinge apparatus 18 has a pivot axis C. The second hinge apparatus 13 has a pivot axis B. The pivot axes A, B and C are oriented parallel to one another. The pivot axes are oriented, in particular, in the width direction and thus horizontally oriented.

In particular, the cooking appliance 1 has two first hinge apparatuses 12, two second hinge apparatuses 13 and two third hinge apparatuses 18. These hinge apparatuses are arranged in each case on opposing end sides of the door segments 5, 6 in the width direction.

As can be identified in FIG. 3 and also in the other figures, the first door segment 5 is configured in a plate-like manner. The second door segment 6 is also configured in a plate-like manner.

Figure 4:
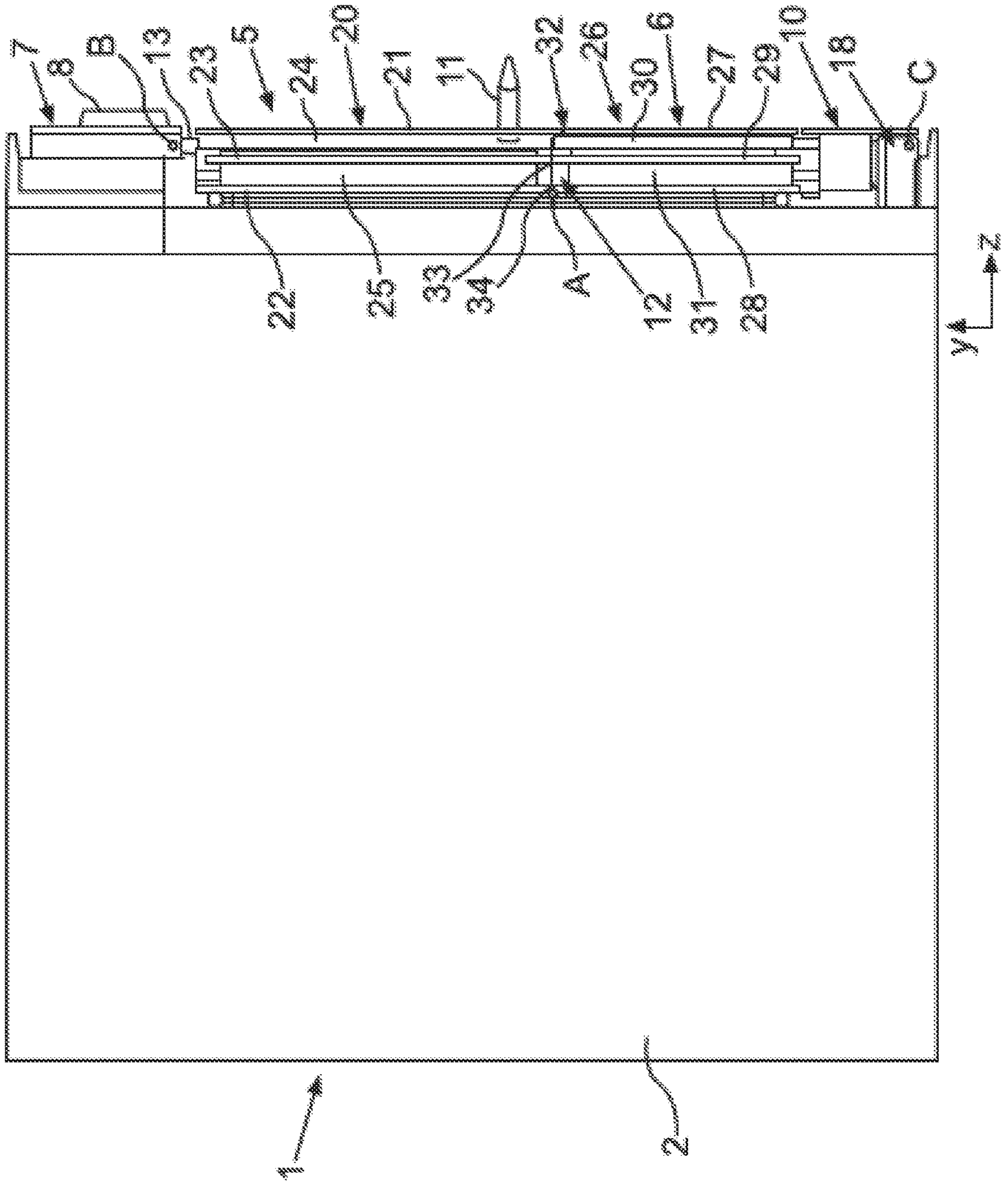
FIG. 4 shows a schematic sectional view of the cooking appliance according to FIG. 1.

In FIG. 4 the cooking appliance 1 is shown in a schematic sectional view in the state according to FIG. 1. It can be identified that the first door segment 5 has a first pane pack 20. In the exemplary embodiment, the first pane pack 20 has a front pane 21 and an inner pane 22 as door panes. In particular, an intermediate pane 23 is also provided so as to be arranged between the front pane 21 and the inner pane 22. These plate-like and, in particular, at least partially transparent door panes are oriented parallel to one another and spaced apart from one another in the depth direction (z-direction). As a result, the intermediate spaces 24 and 25 are formed between the respective individual door panes. These intermediate spaces 24 and 25 can also be used as air channels in order to be able to pass through air in a defined manner. As a result, in particular, the door panes are cooled.

Moreover, in FIG. 4 in one exemplary embodiment it can also be identified that the second door segment 6 has a pane pack 26. In particular, this pane pack 26 is configured with a front pane 27 and an inner pane 28 as door panes. In particular, an intermediate pane 29 is also provided. As can be identified in FIG. 4 in this closed end position of the folding door 4, the front panes 21 and 27 are arranged in the height direction directly on top of one another and positioned so as to be aligned with one another. In particular, this also applies to the inner panes 22 and 28. This also applies to the intermediate panes 23 and 29. As can be identified in FIG. 4, an air space 30 and 31 is also configured between the respective door panes of the second pane unit 26.

In the exemplary embodiment shown, the pivot axis A is configured so as to be offset relative to the two other pivot axes C and B, with respect to the depth direction. In particular, a spacing measured in the depth direction is configured in this case to be between 1 cm and 7 cm, in particular between 2 cm and 7 cm, in particular between 3 cm and 7 cm, in particular between 4 cm and 7 cm. This spacing can also be larger. The pivot axes A, B and C are in this case oriented perpendicular to the plane of the figure.

Figure 5:
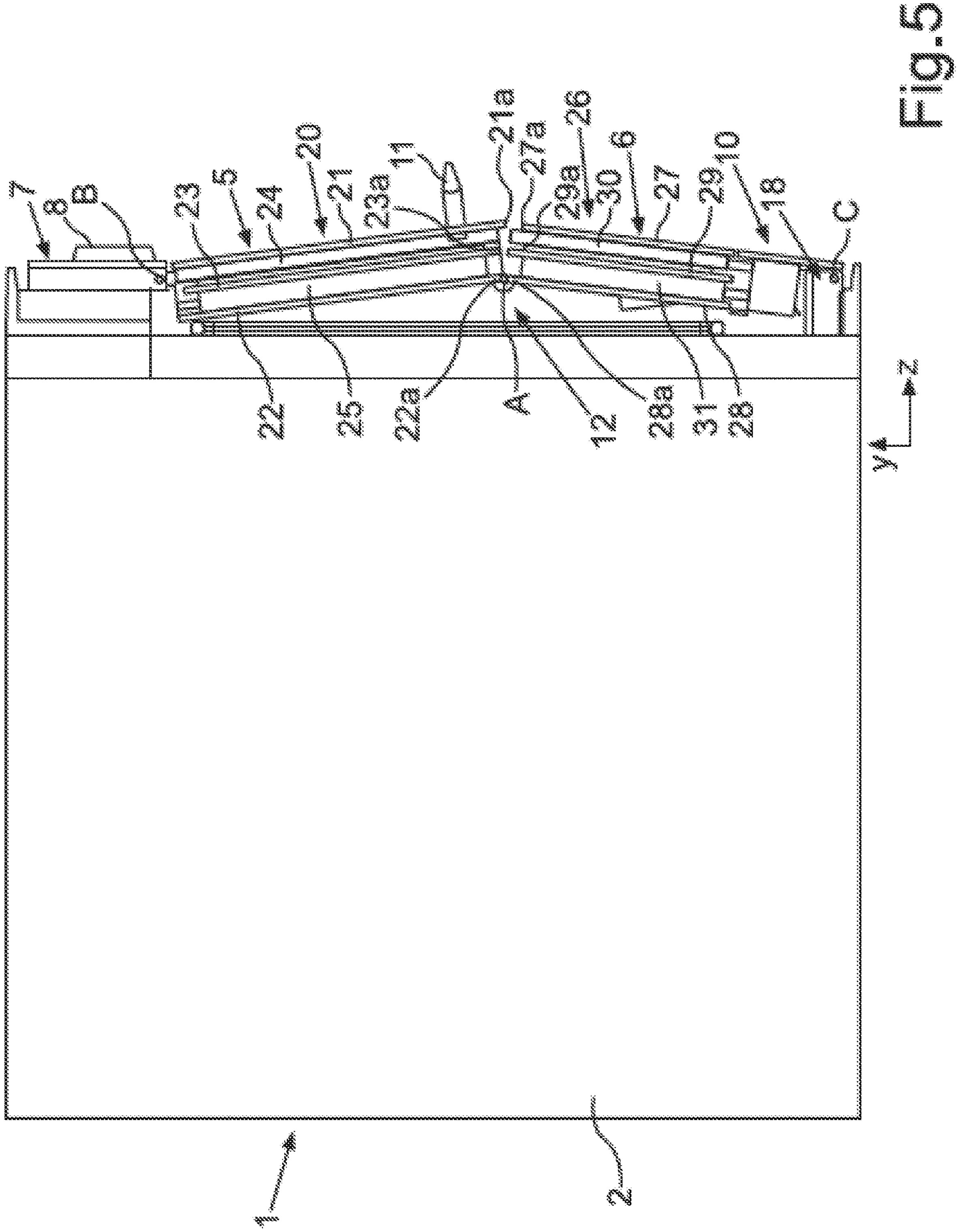
FIG. 5 shows a schematic sectional view of the cooking appliance according to FIG. 2.

In one exemplary embodiment, it is provided that a transition 32 between a lower rim or a lower edge 21*a* (FIG. 5) of the front pane 21 and an upper rim or an upper edge 27*a* of the front pane 27 is arranged further down, with respect to the height direction, than the corresponding transitions 33 and 34 between other door panes of the pane packs. The transition 33 in this context is formed between a lower edge 23*a* of the intermediate pane 23 and an upper edge 29*a* of the intermediate pane 29. The transition 34 is formed between a lower edge 22*a* of the inner pane 22 and an upper edge 28*a* of the inner pane 28. In particular, the transitions 33 and 34 and thus the corresponding interfaces are arranged in this case at the same height with respect to the height direction.

In particular, this offset between the interfaces or transitions 33 and 34, on the one hand, in relation to the transition 32 is several centimeters, measured in the height direction. In particular, this spacing in the closed state or in the closed end position of the folding door 4 is less than 10 cm, in particular less than or equal to 5 cm, but greater than 1 cm.

As can also be identified in FIG. 4, the pivot axis A of the first hinge apparatus 12 in the closed end position of the folding door 4 is arranged closer to the cooking chamber 3 than the inner panes 22 and 28, in particular the rear faces thereof, with respect to the depth direction.

Figure 6:
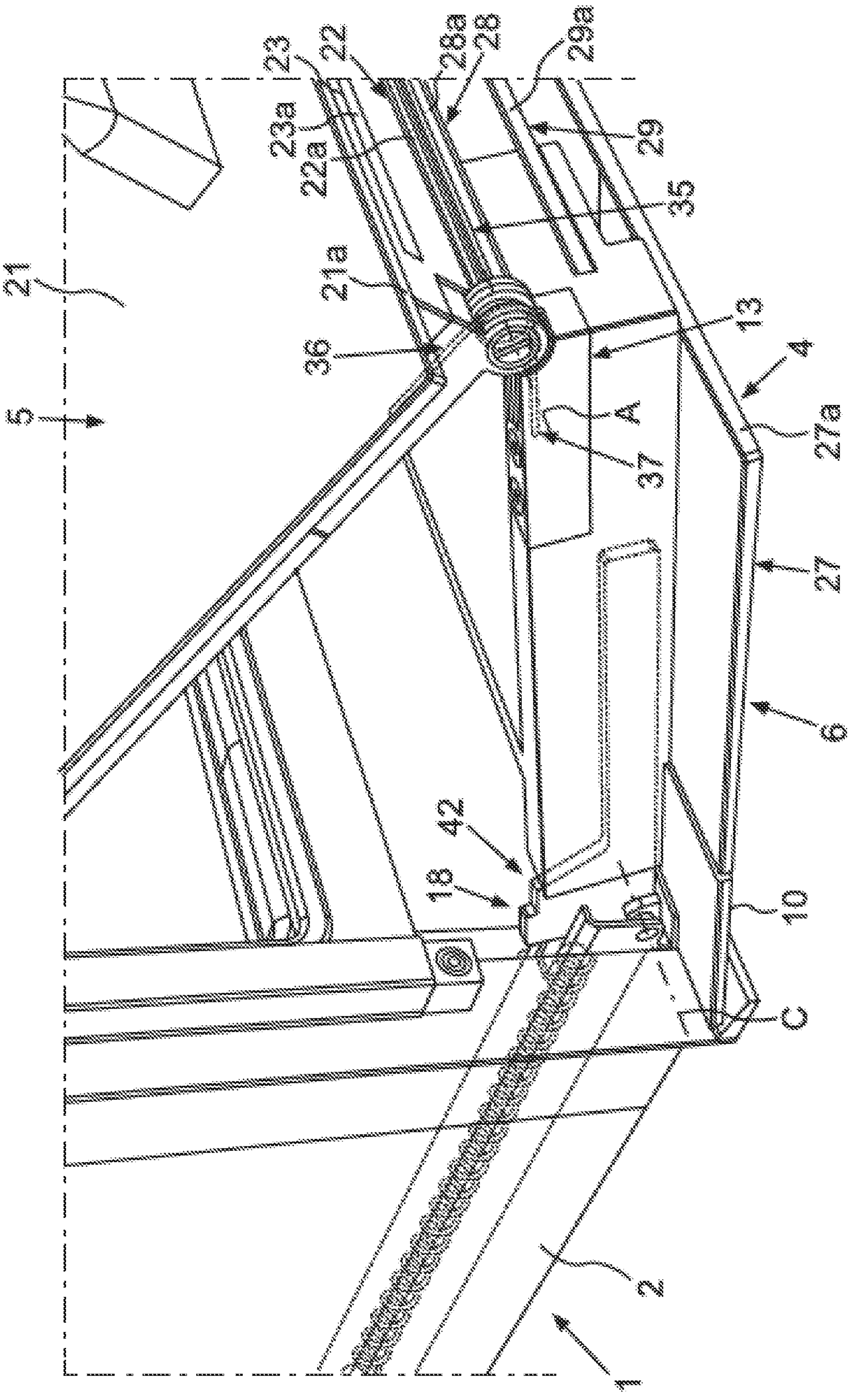
FIG. 6 shows a perspective partial view of the cooking appliance according to FIG. 1 to FIG. 5 with a schematic view of additional components.

In one exemplary embodiment, it is provided that a seal 35 is arranged at the transition 34 between the lower edge 22*a* and the upper edge 28*a* (FIG. 6). The seal 35 is, in particular, a hollow chamber seal. In particular, the seal 35 is a weatherstrip-type seal. As a result, a gap is sealed at the transition 34 which is formed between the lower edge 22*a* and the upper edge 28*a*, in particular also in the closed end position of the folding door 4. In particular, the seal 35 is configured such that it correspondingly provides a seal in all folded positions of the door segments 5 and 6 to one another.

In FIG. 6 a partial section of the cooking appliance 1 is shown in a perspective view, wherein here the folding door 4 is shown in an intermediate position between the open end position and the closed end position. A movement assistance apparatus 36 of the cooking appliance 1 is shown schematically here. In particular, this movement assistance apparatus 36 has at least one spring 37. In particular, the spring 37 is arranged in the region of the first hinge apparatus 13.

In particular, an unfolding movement of the folding door 4 is assisted thereby. Thus, starting from the folded, open end position shown in FIG. 3, the process is assisted to the unfolded, closed end position of the folding door 4. This spring 27 is tensioned during the opening process, so that a corresponding spring force is created.

Figure 7:
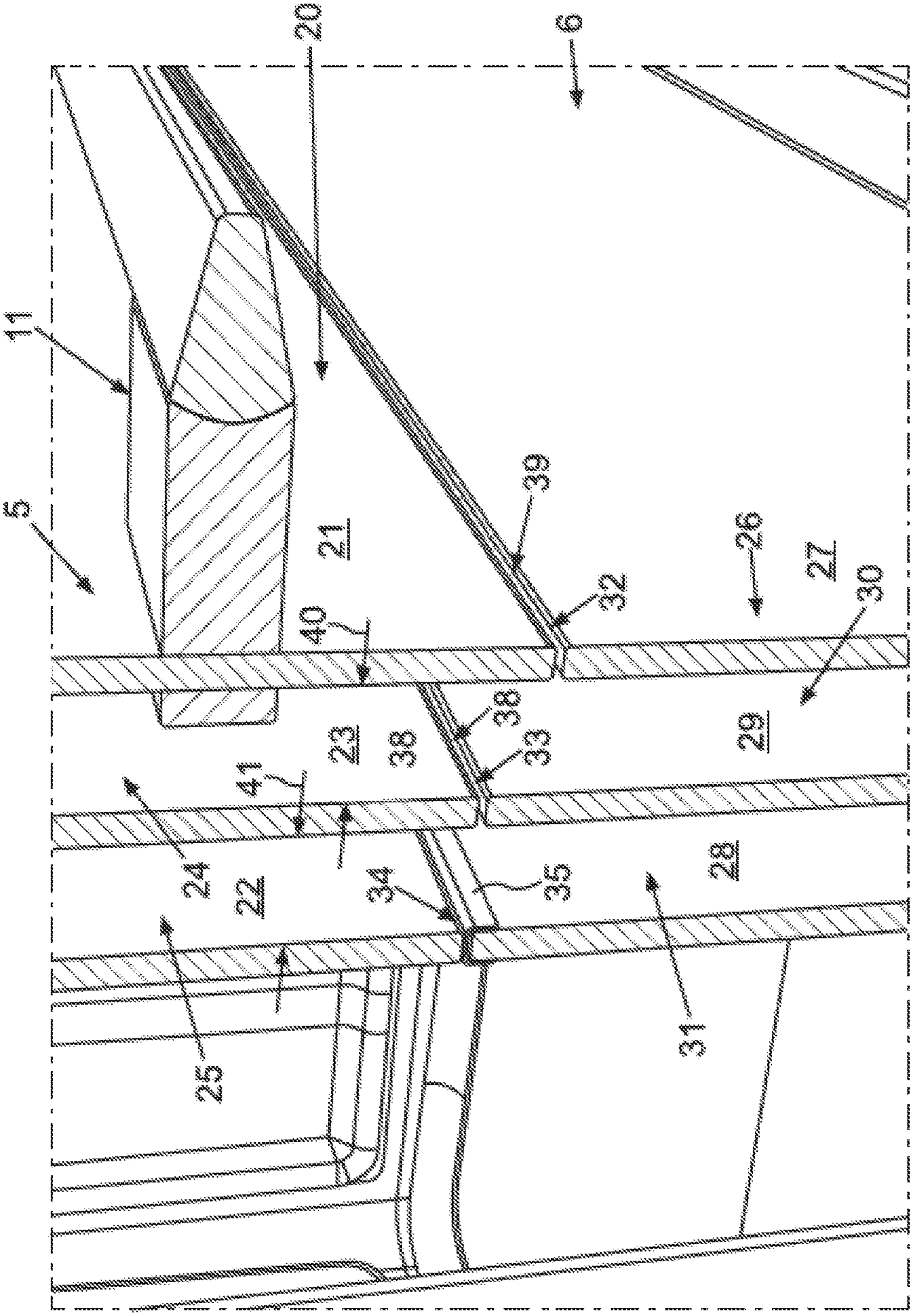
FIG. 7 shows a perspective partial sectional view of the cooking appliance in the region of the folding door in the unfolded, closed end position.

In FIG. 7 the folding door 4 is shown partially in section in a schematic partial view in the closed end position. The two pane packs 20 and 26 are shown. The gaps 38 and 39 are also shown. These gaps are formed at the transitions 32 and 33. The height of these gaps 38 and 39 measured in the height direction is smaller by a multiple than a spacing measured in the depth direction, in each case between adjacent door panes of the pane packs 20, 26. These spacings are shown here by 40 and 41.

In one exemplary embodiment, it is provided that the folding door 4 is held in its open end position by a holding unit 42 (FIG. 6). An undesired independent upward movement, in particular due to the at least one pretensioned spring 37, which is preferably present, is avoided thereby.

The holding unit 42 can be, for example, a snap connection and/or a magnetic holder. Correspondingly, a holding unit which holds the unfolded, closed end position of the folding door 4 can also be provided. This can also be the holding unit 42.

Figure 8:
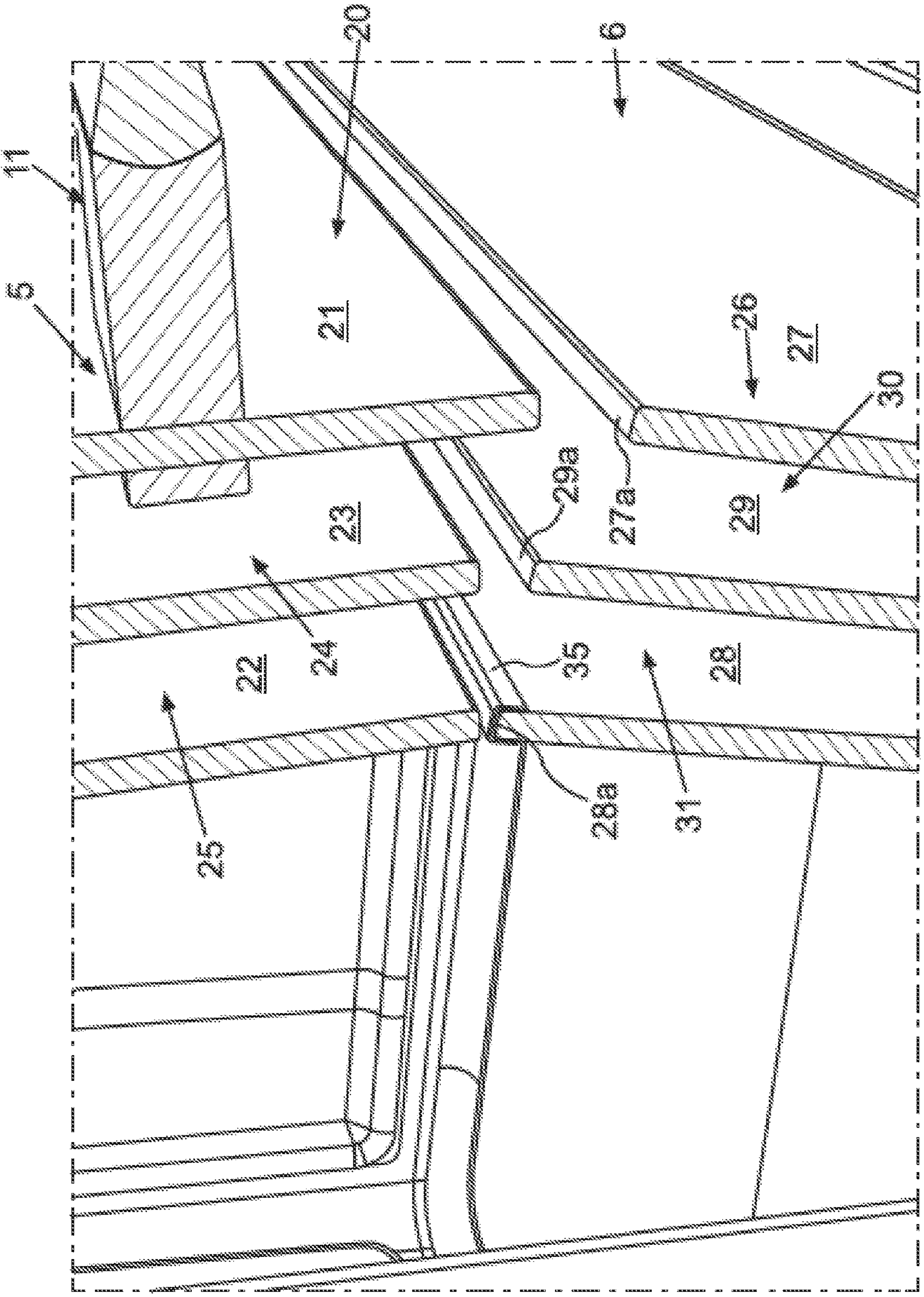
FIG. 8 shows a view according to FIG. 7 with the folding door in an intermediate position.

In FIG. 8 the view according to FIG. 7 is shown but in an intermediate position of the folding door 4.

The various positionings of the transitions 32, on the one hand, and 33 and 34, on the other hand, provided in the height direction in the fully open end position of the folding door 4 result in a design as shown in FIG. 3. In this regard, the front pane 21 of the upper first door segment 5 is located further away from the cooking chamber 3 than the inner pane 22 and, in particular, also the intermediate pane 23. In particular, therefore, this front pane 21 also forms a projection facing the user, or an overhang at the top. This overhang 43 (FIG. 3) prevents undesired contact with the intermediate pane 23 and/or the inner pane 22 and/or the pane pack 26 of the second door segment 6.

Figure 9:
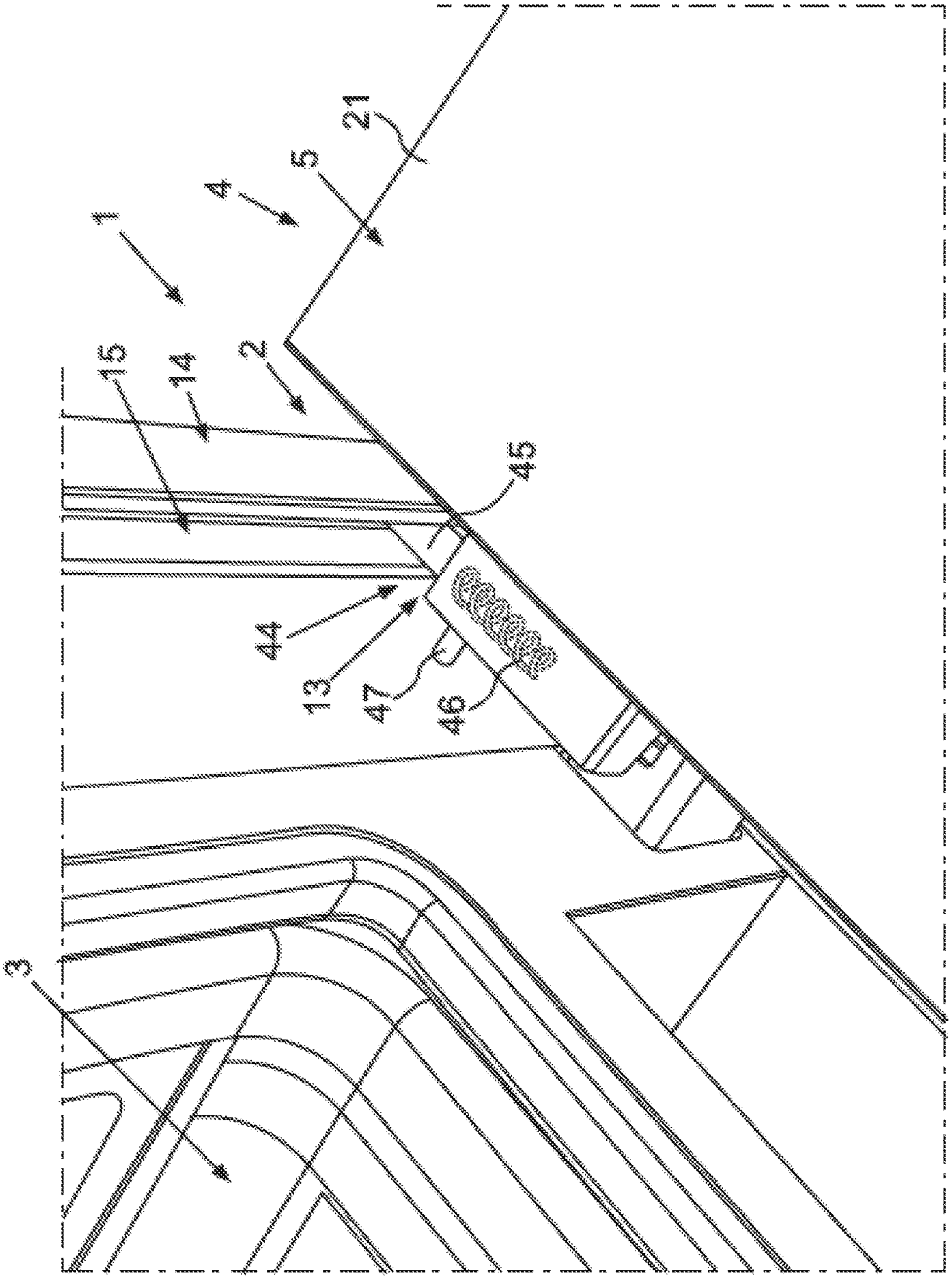
FIG. 9 shows a perspective partial view of the cooking appliance with partial components of a hinge apparatus of the folding door.

In FIG. 9 a right-hand region of the folding door 4 is shown in a perspective partial view, when viewed from above. Here the folding door is not shown in the fully closed end position. This is in order to show a non-destructively releasable connection 44. The connection 44 is a mechanical coupling between the guide apparatus 14 and the further second hinge apparatus 13 shown here. In particular, in this context, a hinge element which is configured as a bolt 45 engages in the guide rail 15, with respect to the width direction. It is provided that this connection 44 has a spring 46, which is shown here only symbolically, in addition to this bolt 45 which, in particular, is a constituent part of the further second hinge apparatus 13. This spring 46 pushes the bolt 45, which is pretensioned thereby in the width direction (x-direction) of the cooking appliance 1, into the guide rail 15. It can be provided that an actuating element 47 is present. By means of this actuating element, the bolt 45 can be displaced counter to the spring force of the spring 46 and thus moved out of the guide rail 15. As a result, the coupled state between the bolt 45 and the guide rail 15 can be released.

Thus it is also achieved that this further second hinge apparatus 13 is released from the guide apparatus 14. In particular, this is also implemented for the second hinge apparatus 13 arranged on the left-hand side as shown in FIG. 3. Thus the first door segment 6 can be completely folded away from the housing 2. Thus the folding door 4 can also be fully cleaned on the inside facing the cooking chamber or is easily accessible for maintenance operations and assembly operations.

It is also possible that a tank for water can be arranged in the storage space 9, additionally or alternatively to the above-mentioned objects. This is advantageous, in particular, if the cooking appliance 1 has a steam cooking function.

It is also possible that the cooking appliance has a motor 48 (FIG. 1). The movement of the folding door 4 can be automatically carried out at least in some portions by this motor 48.

The invention claimed is:

1. A cooking appliance, comprising:

a housing having a cooking chamber;

a door for closing the cooking chamber, said door configured as a folding door including a first door segment and a second door segment separate from the first door segment;

a first hinge apparatus configured to directly interconnect pivotably the first and second door segments;

a second hinge apparatus located at a door segment end of the first door segment, the door segment end being an end of the first door segment opposite to the first hinge apparatus;

a guide apparatus arranged on the housing, said first door segment connected at the door segment end of the first door segment to the guide apparatus via the second hinge apparatus;

a third hinge apparatus via which the second door segment is connected at a door segment end of the second door segment to the housing, wherein the first door segment includes a first pane pack with at least two door panes, and the second door segment includes a second pane pack with at least two door panes, wherein in an unfolded, closed end position of the folding door, a gap between a front pane of the at least two door panes of the first pane pack and a front pane of the at least two door panes of the second pane pack is arranged further down than a gap between a further one of the at least two door panes of the first pane pack and a corresponding further one of the at least two door panes of the second pane pack, with respect to a height direction of the cooking appliance.

2. The cooking appliance of claim 1, wherein, when the folding door is closed, the pivot axis of the first hinge apparatus is distanced from the pivot axes of the second hinge apparatus and the third hinge apparatus at a spacing between 2 cm and 7 cm as measured in the depth direction.

3. The cooking appliance of claim 1, wherein the first, second and third hinge apparatuses are arranged such that in a folded-up end position the first and second door segments are arranged at an internal angle of greater than 0° in relation to one another.

4. The cooking appliance of claim 1, wherein the first, second and third hinge apparatuses are arranged such that in a folded-up end position the first and second door segments are arranged at an internal angle of between 1° and 10° in relation to one another.

5. The cooking appliance of claim 1, wherein in the unfolded, closed end position of the folding door the pivot axis of the first hinge apparatus is arranged closer to the cooking chamber than an inner pane of the at least two door panes of the first pane pack of the first door segment and an inner pane of the at least two door panes of the second pane pack of the second door segment, which inner panes are located closest to the cooking chamber.

6. The cooking appliance of claim 1, wherein the first door segment is an upper first door segment, and the second door segment is a lower second door segment, and further comprising a seal arranged between an inner pane of the at least two door panes of the pane packs of the first and second door segments located closest to the cooking chamber, so that a gap is sealed between a lower edge of the inner pane of the upper first door segment and an upper edge of the inner pane of the lower second door segment.

7. The cooking appliance of claim 6, wherein the seal is a hollow chamber seal or a weatherstrip-type seal.

8. The cooking appliance of claim 6, wherein the gap is sealed in all folded positions of the first and second door segments relative to one another.

9. The cooking appliance of claim 1, wherein the first door segment is an upper one of the first and second door segments, and the second door segment is a lower one of the first and second door segments, wherein in the closed, unfolded end position of the folding door, a spacing measured in the depth direction between two door panes of the upper pane pack and two corresponding door panes of the lower pane pack is larger by a multiple than a gap measured in a height direction between a lower edge of a door pane of the upper pane pack of the first upper door segment and an upper edge of a corresponding door pane of the lower pane pack of the second lower door segment.

10. The cooking appliance of claim 1, wherein the folding door includes a biaser configured to generate a folding force for assisting a folding process and/or an unfolding process.

11. The cooking appliance of claim 10, wherein the biaser includes a spring to assist at least the unfolding process for closing the folding door by spring force as the folding force.

12. The cooking appliance of claim 1, further comprising a motor to at least partially drive a folding process and a resultant opening and/or closing movement of the folding door.

13. The cooking appliance of claim 1, further comprising a holder configured to hold an unfolded, closed end position of the folding door and/or a folded open end position of the folding door.

14. The cooking appliance of claim 13, wherein the holder is a snap connection and/or a magnetic holder.

15. The cooking appliance of claim 1, wherein the second hinge apparatus is connected to the guide apparatus by a non-destructively releasable connection.

16. The cooking appliance of claim 15, wherein the non-destructively releasable connection includes a spring and a bolt which is held so as to be pretensioned by the spring and non-destructively releasable from a connecting position for uncoupling the second hinge apparatus from the guide apparatus, when the bolt is pushed against the spring.

17. The cooking appliance of claim 1, wherein the first door segment is an upper one of the first and second door segments and said first door segment extends to an internal angle of greater than 90° in relation to a vertical, when the folding door assumes a folded, open end position.

18. The cooking appliance of claim 1, wherein the housing includes below the cooking chamber a storage space for accessories, and further comprising a separate pivoting door for closing the storage space.

19. A cooking appliance, comprising:

a housing having a cooking chamber;

a door for closing the cooking chamber, said door configured as a folding door including a first door segment and a second door segment separate from the first door segment;

a first hinge apparatus configured to directly interconnect pivotably the first and second door segments;

a second hinge apparatus;

a guide apparatus arranged on the housing, said first door segment connected at a door segment end of the first door segment to the guide apparatus via the second hinge apparatus;

a third hinge apparatus via which the second door segment is connected at a door segment end of the second door segment to the housing, wherein, when the folding door is closed, a pivot axis of the first hinge apparatus is arranged closer to the cooking chamber than a pivot axis of the second hinge apparatus and is arranged closer to the cooking chamber than a pivot axis of the third hinge apparatus, with respect to a depth direction of the cooking appliance, and wherein the first door segment includes a first pane pack with at least two door panes, and the second door segment includes a second pane pack with at least two door panes, wherein in an unfolded, closed end position of the folding door, a gap between a front pane of the at least two door panes of the first pane pack and a front pane of the at least two door panes of the second pane pack is arranged further down than a gap between a further one of the at least two door panes of the first pane pack and a corresponding further one of the at least two door panes of the second pane pack, with respect to a height direction of the cooking appliance.

* * * * *